United States Patent [19]

Bobb et al.

[11] Patent Number: 5,166,988

[45] Date of Patent: Nov. 24, 1992

[54] THERMAL PHASE MODULATOR AND METHOD OF MODULATION OF LIGHT BEAMS BY OPTICAL MEANS

[75] Inventors: Lloyd C. Bobb, Warminster; Howard D. Krumboltz, Chalfont, both of Pa.

[73] Assignee: The United States of America as represented by the Secretary of the Navy, Washington, D.C.

[21] Appl. No.: 785,860

[22] Filed: Oct. 31, 1991

[51] Int. Cl.$^5$ .......................... G02B 6/02; G01B 9/02; H01J 5/16

[52] U.S. Cl. .......................................... 385/1; 385/3; 385/9; 385/123; 385/126; 385/128; 356/345; 250/227.19

[58] Field of Search ................... 385/1, 2, 3, 8, 9, 12, 385/40, 41, 42, 88, 123, 126, 127, 128; 356/345; 250/227.11, 227.19; 332/144, 174, 185

[56] References Cited

U.S. PATENT DOCUMENTS

| | | | |
|---|---|---|---|
| 4,204,742 | 5/1980 | Johnson et al. | 385/23 |
| 4,753,505 | 6/1988 | Mikami et al. | 385/5 |
| 4,786,130 | 11/1988 | Georgiou et al. | 385/40 |
| 4,820,016 | 4/1989 | Cohen et al. | 385/5 |
| 4,859,059 | 8/1989 | Bobb et al. | 356/345 |
| 4,970,713 | 11/1990 | Imoto | 385/4 |
| 4,979,796 | 12/1990 | Cardarelli et al. | 385/123 |
| 4,996,692 | 2/1991 | Kabacoff | 385/1 |
| 5,029,978 | 7/1991 | Curtis et al. | 385/3 |
| 5,047,626 | 9/1991 | Bobb et al. | 250/227.19 |

Primary Examiner—Brian Healy
Attorney, Agent, or Firm—James V. Tura; James B. Bechtel; Susan E. Verona

[57] ABSTRACT

Apparatus is provided for modulating the phase of a coherent light beam propagating through the core of a single-mode waveguide. A light-absorbing element is connected to a portion of the cladding of the waveguide such that there is a thermal interface therebetween. A means is provided for launching light into the portion of the cladding of the waveguide having the light-absorbing element connected thereto. The light-absorbing element absorbs the light and produces heat in proportion to the light's energy. The heat thus produced is transferred to the waveguide, changing its optical path length and varying the phase of the light propagating therethrough. The intensity of the light launched into the cladding is variable and is controlled by a power supply. The modulator may be used in an interferometer in which a signal is directed to the power supply to control the light intensity for various purposes.

14 Claims, 4 Drawing Sheets

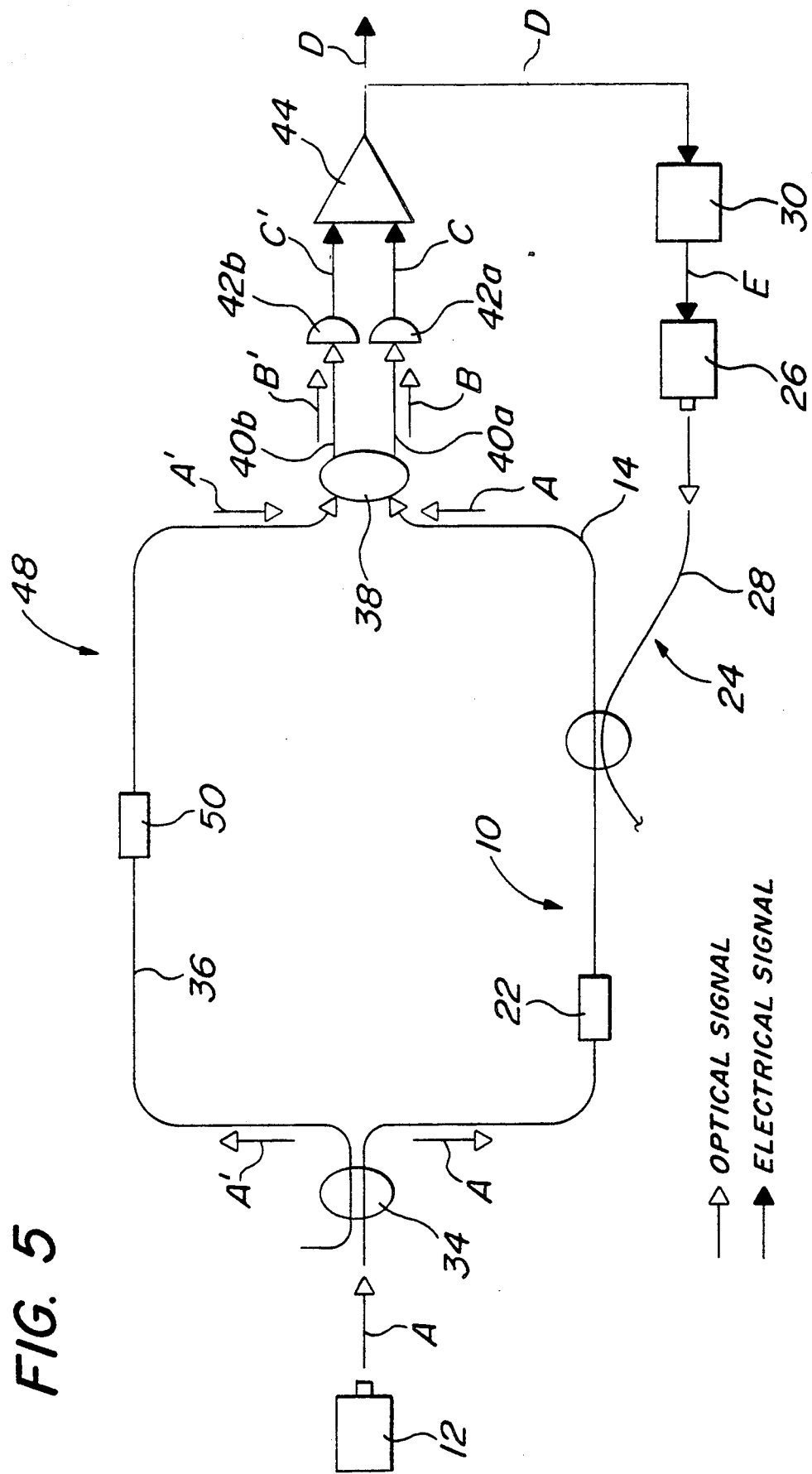

THERMAL PHASE MODULATOR AND METHOD OF MODULATION OF LIGHT BEAMS BY OPTICAL MEANS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to a light beam phase modulator, and more particularly to a thermal modulator for use with an optical fiber interferometer.

Modulators for changing the phase of a coherent light beam passing through an optical waveguide such as an optical fiber are well-known to those skilled in the optical arts. Such modulators can be found in interferometers of the type wherein a physical parameter is sensed by directing light through an optical waveguide which is adapted to be altered by the physical parameter, and measuring the change in the phase of the light caused by the physical parameter by measuring the interference pattern created by combining the light with light from a reference optical waveguide. Examples of such interferometers include Mach-Zehnder and Michelson interferometers. One type of modulator used in interferometers is an electrically resistive element disposed on one of the optical waveguides. Current is supplied to the element for the purpose of heating the waveguide on which it is disposed (via $I^2R$ losses), thereby proportionately varying the waveguide's length and refractive index and hence its optical path length. This change in optical path length shifts the phase of the light beam passing through the waveguide, which shift can be measured by measuring the resulting change in the interferometer's interference pattern. U.S. Pat. No. 5,047,626 to Bobb et al. discloses the use of such an electrically resistive element on one of the optical waveguides of a Mach-Zehnder interferometer as the sensing element of the interferometer. Physical parameters which can be measured by measuring heat loss, such as a fluid's thermal conductivity, are measured by heating the resistive element and then measuring the change in temperature of the fiber as it cools by monitoring the change in interference pattern which occurs, the rate of change of the temperature being influenced by and indicative of the parameter being measured.

Such Mach-Zehnder interferometers often include means for maintaining quadrature between the two light beams by controlling the optical path length of one of the optical waveguides. U.S. Pat. No. 4,859,059 to Bobb et al. discloses maintaining quadrature by supplying current to an electrically resistive modulator disposed on one of the optical waveguides.

Heating the resistive element with current in these applications involves running electrical leads thereto. This can be dangerous when sensing physical parameters of a flammable liquid. In other applications, the sensing environment may have a high potential or electric field (such as when microwaves are being used), in which case electrical leads would be undesirable because they would provide a conductive path to ground. For other applications, the sensing environment may not provide sufficient space for electrical leads, as when the sensing environment is a small amount of fluid in a confined cell or when the sensor is a probe for the human body.

SUMMARY OF THE INVENTION

It is therefore a general object of the present invention to provide a light beam phase modulator for a waveguide.

It is a specific object to provide a thermal modulator for a waveguide in an interferometer.

It is a more specific object to provide an optically heated thermal modulator for an optical waveguide in an interferometer.

It is another object to provide a means for modulating a light beam in a waveguide, which means does not require electrical leads.

Briefly, these and other objects are accomplished by apparatus for modulating the phase of a coherent light beam propagating through the core of a single-mode waveguide, comprising a light-absorbing element operatively connected to a portion of the cladding of the waveguide such that there is a thermal interface therebetween, and means for launching light into the portion of the cladding having the light-absorbing element connected thereto, whereby the absorbing element absorbs the light, producing heat in proportion to the light's energy. The heat thus produced is transferred to the waveguide, changing its optical path length and varying the phase of the light propagating therethrough. The intensity of the light launched into the cladding is variable and is controlled by a power supply. The modulator may be used in an interferometer in which a signal is directed to the power supply to control the light intensity for various purposes.

Other objects, advantages, and novel features will become apparent from the following detailed description of the invention when considered in conjunction with the accompanying drawings.

DESCRIPTION OF THE DRAWINGS

FIG. 5 diagramatically illustrates another application of the thermal modulator of FIG. 1 incorporated into an optical fiber interferometer being used to measure magnetic field.

DESCRIPTION OF THE PREFERRED EMBODIMENT

Figure 1:
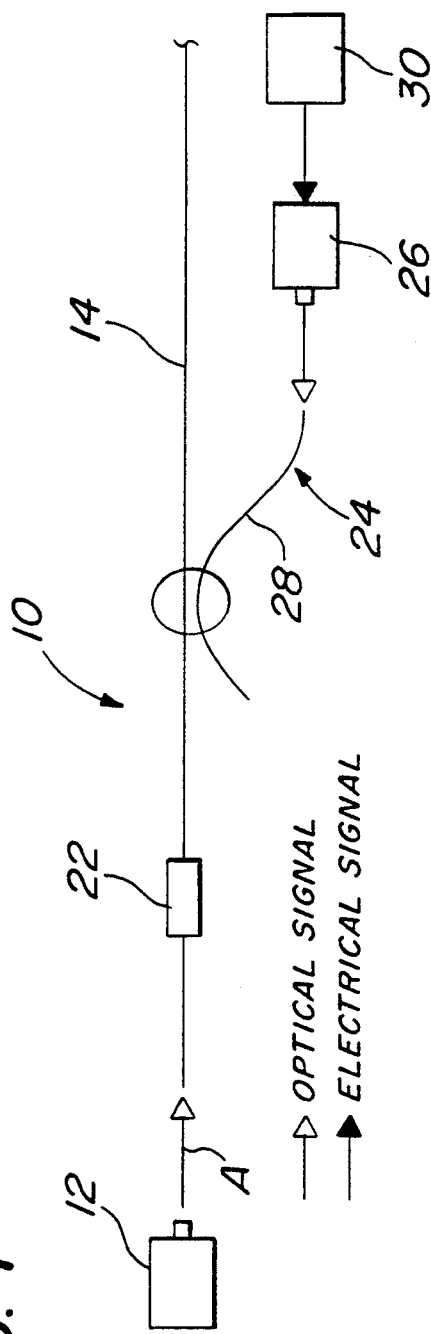
FIG. 1 is a diagrammatic view of the thermal modulator of the present invention connected to modulate the phase of a light beam propagating through the core of a single-mode waveguide.
Figure 2A:
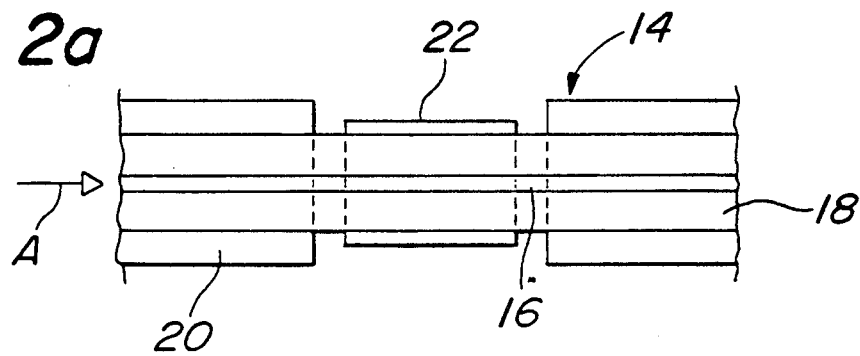
FIG. 2a is a cross-sectional view along the length of the waveguide of FIG. 1, illustrating one embodiment of the light-absorbing element.
Figure 2B:
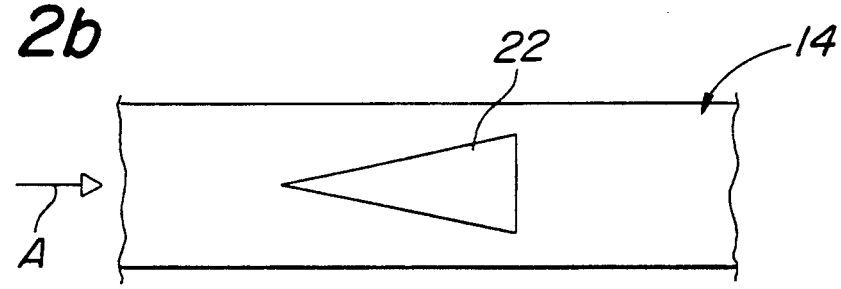
FIG. 2b is a diagrammatic view of the waveguide of FIG. 1, illustrating another embodiment of the light-absorbing element.

Referring now to the drawings wherein like characters designate like or corresponding parts throughout the several views, one sees in FIG. 1 one preferred embodiment of the thermal modulator 10 of the present invention, being used to control the phase of a light beam A from coherent light source 12 propagating through an optical waveguide 14. As shown in more detail in FIG. 2a, optical waveguide 14, which is preferably a single-mode optical fiber for propagating coherent light therethrough, has a core 16 through which light from source 12 propagates, a cladding 18, and a non-stripping jacket 20. A light-absorbing element 22 is disposed on cladding 18 such that there is a thermal interface therebetween. Jacket 20 is removed from the portion of cladding 18 which has element 22 disposed thereon for this purpose. Light-absorbing element 22 may be any material which is capable of absorbing a preselected wavelength band of light and generating heat in response thereto and which is capable of thermally interfacing with the waveguide. Thin metallic films such as gold, known absorbers such as carbon black, and even pigment, as from a water-proof marking pen, are effective materials. Keeping the thermal mass of element 22 to a minimum saves energy and shortens the thermal response time of modulator 10; therefore, element 22 should preferably be a thin coating (on the order of 1000 angstroms thick) of the kind achievable using vacuum deposition or chemical vapor deposition. The length of light-absorbing element 22 may vary and will depend upon the needs of the application. For instance, if element 22 must be contained within a cell, the dimensions of the cell will dictate the length of the element. The amount of the circumference of cladding 18 which is covered by light absorbing element 22 may vary from application to application as well. One convenient embodiment is to dispose light-absorbing element 22 around the entire circumference of cladding 18 along a portion of the length of optical waveguide 14, as shown in FIG. 2a. Also, the amount of the cladding circumference which is covered by light absorbing element 22 may vary along the length of the cladding, as shown in FIG. 2b, to affect the absorption profile of the element, if desired for particular applications.

Figure 2C:
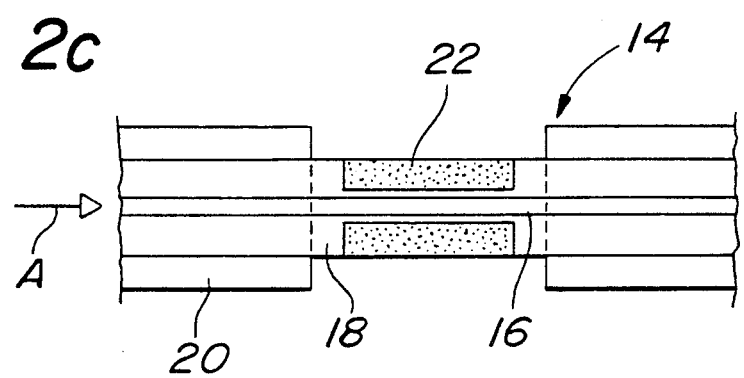
FIG. 2c is a cross-sectional view along the length of the waveguide of FIG. 1, illustrating yet another embodiment of the light-absorbing element.

FIG. 2c shows an alternative embodiment of modulator 10 having light-absorbing element 22 diffused into cladding 18 around the entire circumference thereof. In this embodiment, light-absorbing element 22 may be any of a variety of metal atoms which are absorbers and which are capable of being diffused into glass, such as neodymium. As with the coating embodiment, the length and circumferential amount of cladding 18 which is diffused with light-absorbing material will vary according to the needs of the application.

Figure 3:
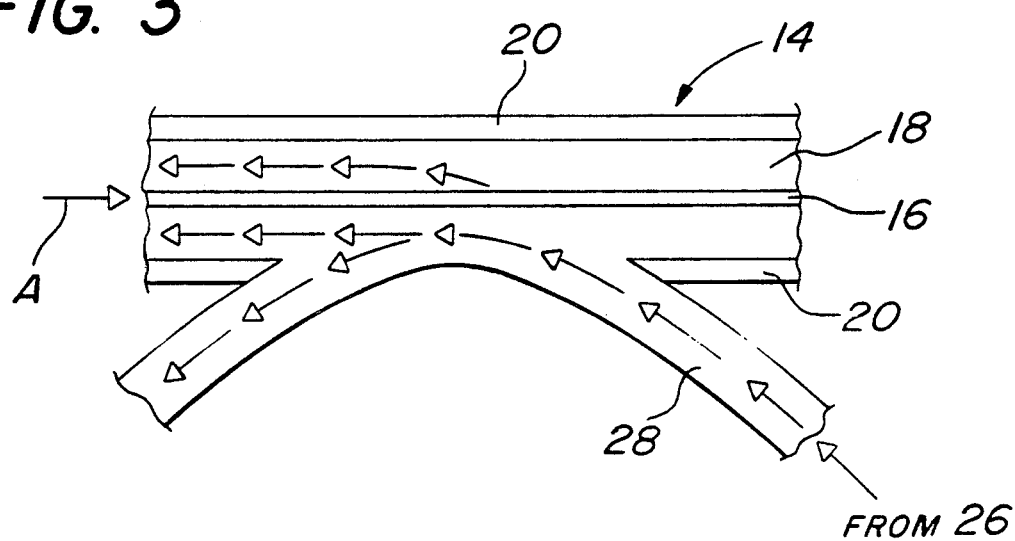
FIG. 3 is a detailed view of a portion of the thermal modulator of FIG. 1 illustrating how light may be coupled into the cladding of the single-mode waveguide.

A means 24 for directing light into light-absorbing element 22 is operatively connected thereto. Means 24 may be any means by which element 22 is exposed to light. Preferably, means 24 is a means for launching light into cladding 18 so that it propagates through the cladding and into the portion thereof having light-absorbing element 22 connected thereto, either as a coating or as a diffusion. This may best be accomplished by a variable-intensity light source 26 coupled to launch light into cladding 18 in the direction o absorbing element 22 via a multimode fiber 28. Those skilled in the optical arts are aware of means for coupling light into the cladding of a fiber so that it will remain in the cladding only and propagate in the desired direction. One technique is to fix multimode fiber 28 to waveguide 14 along a small portion of the length of each, oriented in such a way that the light, when coupled into cladding 18 will continue to propagate in the same direction, towards element 22, as shown in FIG. 3. Multimode fiber 28 may be fixed to waveguide 14 by removing the cladding from a portion of the multimode fiber and bonding that portion to a portion of the waveguide from which jacket 20 has been removed. Bonding can be achieved either with index gel, or by fusing the portions together with heat while stretching fiber 28 and waveguide 14. To ensure that the light launched into cladding 18 reaches light-absorbing element 22 without being stripped away enroute, jacket 20 should be made of a material, such as silicone resin, which has a lower index of refraction than cladding 18.

Variable-intensity light source 26 may be any light source which has a controllable power output, such as a laser diode. The power of light source 26 is controlled by a power supply 30 such as an operational amplifier, which is controlled according to the needs of the application. The power range of light source 26 will depend upon how much waveguide 14 needs to be heated or how much phase shift is desired for the particular application of modulator 10. The wavelength band of light source 26 must be one which is readily transmitted by multimode fiber 28 and waveguide 14 and should preferably be selected to match the wavelength absorption band of element 22, although for certain applications it may be desirable to select the wavelength bands so that element 22 can absorb only a small portion of the total power of light source 26. As an example, an ITT T-1601 silica fiber having a 4 $\mu$m diameter core 16 and an 80 $\mu$m diameter cladding 18 carrying light from a 0.63 $\mu$m wavelength coherent light source 12 will experience a phase change of about $2\pi$ radians for 1 millijoule of light energy absorbed. A pulsed, 5 mW laser diode having an 880 nm wavelength and a narrow bandwidth may be used with a 2-inch long absorbing element of black pigment from a water-proof marking pen covering the entire circumference of the cladding 18 of the fiber to achieve 1 millijoule of absorption.

In operation, a coherent light beam A of a given phase from source 12 is launched into core 16 of waveguide 14. Electrical power from power supply 30 is supplied to variable-intensity light source 26, causing it to launch light into multimode fiber 28, which couples the light into cladding 18, in the direction of light-absorbing element 22. The light propagates through cladding 18 until it reaches element 22, which absorbs it, thereby creating heat. The heat transfers to waveguide 14, producing a proportionate change in its optical path length, thereby shifting the phase of the light beam A propagating through core 16.

Figure 4:
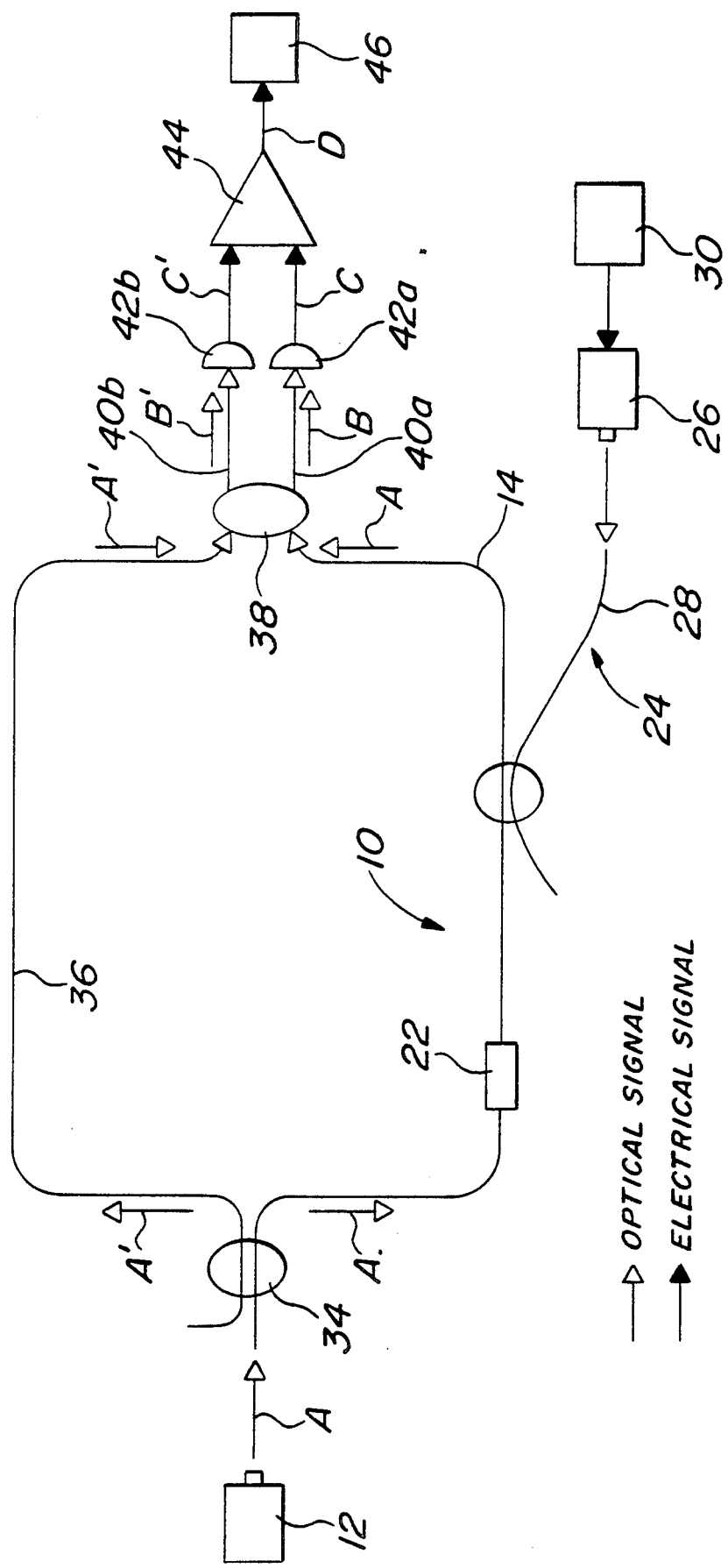
FIG. 4 diagrammatically illustrates the thermal modulator of FIG. 1 incorporated into an optical fiber interferometer.

A particular application for modulator 10 of this invention is found in an optical fiber interferometer such as a Mach-Zehnder interferometer 32, shown in FIG. 4. Modulator 10 is connected to modulate or shift the phase of light propagating through waveguide 14, which forms one arm of interferometer 32. Coherent light source 12 is coupled through a beam splitter 34, such as an optical fiber coupler, to launch substantially identical light beams A and A' through the cores of optical waveguide 14 and a second parallel waveguide 36, which forms the other arm of interferometer 32. The light beams A and A' from waveguides 14 and 36 are combined to interfere at a combiner 38, such as an optical fiber coupler. The combined light then exits combiner 38 as two beams B and B' via exit fibers 40a and 40b to be collected by photodiodes 42a and 42b which convert the light beams B and B' to electrical signals C and C', which are proportional to the intensities of beams B and B'. A differential amplifier 44 receives and compares electrical signals C and C' from photodiodes 42a and 42b and produces an electrical signal D which is proportional to the difference in intensities of beams B and B' through fibers 40a and 40b. The difference in intensities of beams B and B' is indicative of the relative phase of the beams A and A' through waveguides 14 and 36. Signal D therefore indicates the phase shift which has occurred as a result of using modulator 10 to heat waveguide 14. If desired, the signals from differential amplifier 44 can be recorded and stored by a signal analyzer 46. Modulator 10 should preferably be mounted on waveguide 14 so that light from variable-intensity light source 26 propagates through cladding 18 in a direction which is away from photodiodes 42a and 42b. In other words, the location on waveguide 14 where light is coupled into cladding 18 should be between light-absorbing element 22 and photodiodes 42a and 42b.

With the above-described interferometer arrangement, modulator 10 can be used as a sensor to measure heat-transfer-related parameters of a fluid, such as thermal conductivity, fluid flow rate, and liquid level sensing, wherein the physical parameter is measured as a function of the change in fiber temperature as a result of heating it. For such applications, a constant amount of light energy should preferably be deposited per unit length of light-absorbing element 22. This can be achieved by tailoring the absorption profile or attenuation length of element 22, as illustrated in FIG. 2b, wherein the amount of surface area of cladding 18 which has light-absorbing element disposed thereon increases with increasing distance from the point where light is coupled into cladding 18. Alternatively, the wavelength bands of light source 26 and element 22 can be selected so that only a small portion of the light power which reaches the element is absorbed thereby. In this case, the power of the light propagating through cladding 18 does not drop off significantly as it proceeds through the portion having element 22 connected thereto. In either case, power supply 30 is controlled so that light source 26 is pulsed.

FIG. 5 illustrates another application for modulator 10 in an interferometer 48 used to sense magnetic field changes. Magnetostrictive device 50 is disposed on either one of waveguides 14 or 36 (shown on 36) for changing the optical path length thereof in response to magnetic field changes. Magnetic field changes are read from signal D from differential amplifier 44. For this application, modulator 10 is used to keep the interferometer operating at its most sensitive location by maintaining it in quadrature. For this purpose, signal D from differential amplifier 44, which is indicative of the difference between the phases of the light beams A and A' through waveguides 14 and 36 of interferometer 48, is connected to power supply 30 for controlling a voltage output E in direct proportion to signal D. The voltage output E from power supply 30 controls the light power output of light source 26. Light source 26 therefore supplies light power in accordance with the voltage supplied thereto. The light is absorbed by element 22 and heat develops therein, in proportion to the energy of the light absorbed, heating waveguide 14 and modulating the phase of the light beam A propagating through core 16 in the desired manner. To maintain waveguide 14 above ambient temperature, signal D is biased to a non-zero value when the difference between signals C and C' is zero. In this way, when waveguide 14 needs to be cooled to maintain guadrature, cooling can be achieved merely by reducing the amount of light directed to element 22. Of course, such an interferometer arrangement can be used to sense any parameters that require quadrature for sensitive operation.

Figure 6:
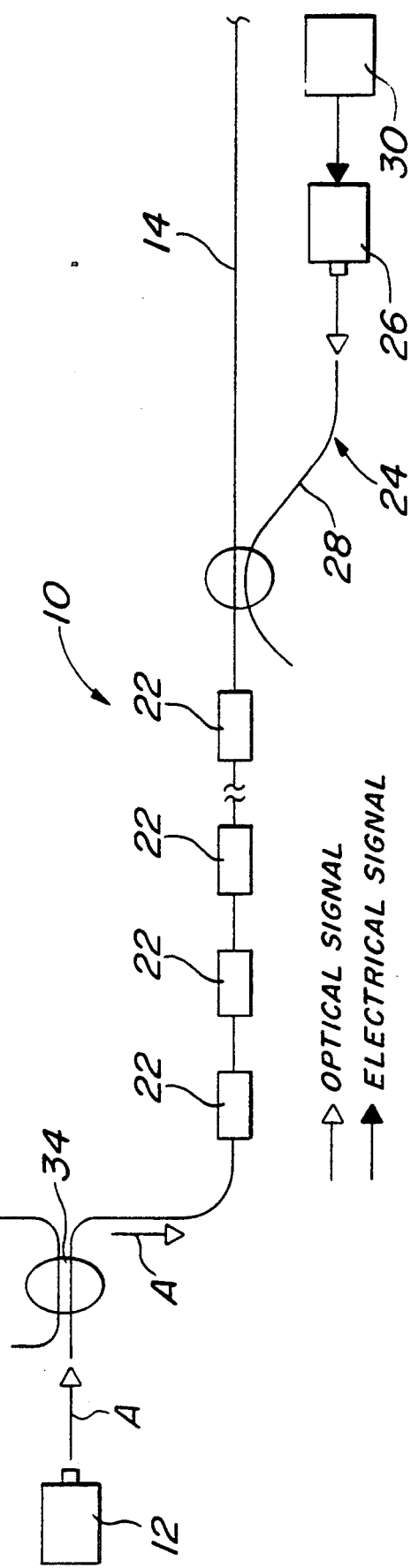
FIG. 6 diagrammatically illustrates an alternate embodiment of the thermal modulator of the present invention shown being used in an interferometer.

FIG. 6 shows an alternative embodiment of modulator 10 according to the invention utilizing selective wavelength absorption. A plurality of light absorbing elements 22 are disposed on waveguide 14, each element having a different absorption spectrum. A wavelength-variable light source 26 is adjusted to generate light of a wavelength band which matches the absorption spectrum of only one element 22 at any given time. This allows the user to selectively activate elements 22, allowing one interferometer to make several different measurements. Alternatively, a plurality of light sources 26 (not shown) can be coupled into cladding 18, each selected to emit a different wavelength light which matches the wavelength absorption spectrum of just one of elements 22.

Some of the many advantages of the invention should now be readily apparent. For instance, a simple means for modulating the phase of light propagating through the core of a single-mode waveguide has been provided. Furthermore, an optically heated thermal modulator for use in an interferometer has been provided which does not require electrical leads thereto.

Those skilled in the art will appreciate without any further explanation that many modifications and variations are possible to the above disclosed light beam phase modulator embodiments, within the concept of this invention. For instance, other configurations and materials than those specifically described may be used for light-absorbing element 22. Additionally, the modulator may be used with other interferometers, such as Fabry-Perot or Michelson interferometers. Consequently, it should be understood that all such modifications and variations fall within the scope of the following claims.

What is claimed:

1. Apparatus for modulating the phase of a coherent light beam propagating through the core of a single-mode waveguide having a core and a cladding by heating the waveguide and thereby changing its optical path length, comprising:
    a light-absorbing element operatively connected to a portion of the cladding of the waveguide such that there is a thermal interface therebetween;
    a variable-intensity light source; and
    means for optically coupling light from said source into the cladding of the waveguide so that the light propagates through the cladding towards said light-absorbing element, whereby said light-absorbing element absorbs the light, producing heat in proportion to the light's energy.

2. The light beam phase modulating apparatus of claim 1, further comprising a means for providing a voltage output to control said variable-intensity light source.

3. The light beam phase modulating apparatus of claim 2 wherein said means for providing a voltage output comprises an operational amplifier.

4. The light beam phase modulating apparatus of claim 1, wherein said variable-intensity light source comprises a laser diode.

5. The light beam phase modulating apparatus of claim 1, wherein said optical coupling means comprises a multi-mode waveguide.

6. The light beam phase modulating apparatus of claim 1, wherein said light-absorbing element comprises a thin coating of light-absorbing material disposed on the outer surface of the cladding.

7. The light beam phase modulating apparatus of claim 6, wherein said thin coating of light-absorbing material comprises gold.

8. The light beam phase modulating apparatus of claim 6, wherein said thin coating of light-absorbing material comprises black pigment.

9. The light beam phase modulating apparatus of claim 6 wherein said thin coating is vacuum deposited onto the cladding.

10. The light beam phase modulating apparatus of claim .1, wherein said light-absorbing element comprises a light-absorbing material diffused into the cladding.

11. The light beam phase modulating apparatus of claim 1, further comprising interferometer apparatus connected to the single-mode waveguide for detecting the change in the optical path length thereof.

12. Apparatus for modulating the phase of a coherent light beam propagating through the core of a single-mode waveguide by heating the waveguide and thereby changing its optical path length, comprising:

a thin coating of light-absorbing material disposed on the outer surface of a portion of the cladding of the single-mode waveguide;

a laser diode;

an operational amplifier connected to supply power to said laser diode in accordance with a predetermined need; and a multimode waveguide optically coupled to transmit light from said laser diode to the cladding of the single-mode waveguide so that the light propagates through the cladding and into the portion thereof having said thin coating disposed thereon, whereby said light-absorbing element absorbs the light, producing heat in proportion to the light's energy.

13. The light beam phase modulating apparatus of claim 12, further comprising interferometer apparatus connected to the single-mode waveguide for detecting the change in the optical path length thereof.

14. A method of thermally modulating the phase of a coherent light beam propagating through the core of a single-mode waveguide having a core and a cladding by heating the waveguide and thereby changing its optical path length, comprising the steps of:

disposing a light-absorbing element on a portion of the cladding of the single-mode waveguide so as to provide a thermal interface therebetween; and optically coupling light into the cladding of the waveguide so that it propagates therethrough in the direction of the light absorbing element, whereby the light-absorbing element absorbs the light, producing heat in proportion to the light absorbed.

* * * * *